(12) United States Patent
Andreasson et al.

(10) Patent No.: US 10,133,459 B2
(45) Date of Patent: Nov. 20, 2018

(54) USABILITY USING BCC ENABLED DEVICES

(71) Applicant: Sony Mobile Communications Inc., Tokyo (JP)

(72) Inventors: Markus Andreasson, Lund (SE); Henrik Bengtsson, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 151 days.

(21) Appl. No.: 14/713,521

(22) Filed: May 15, 2015

(65) Prior Publication Data
US 2016/0334968 A1    Nov. 17, 2016

(51) Int. Cl.
*G06F 3/0484* (2013.01)
*G06F 1/16* (2006.01)
(Continued)

(52) U.S. Cl.
CPC .......... *G06F 3/04842* (2013.01); *G06F 1/163* (2013.01); *G06F 1/1643* (2013.01);
(Continued)

(58) Field of Classification Search
CPC .... G06F 21/629; G06F 3/04842; G06F 1/163; G06F 3/147; G06F 3/044; G06F 3/0488;
(Continued)

(56) References Cited

U.S. PATENT DOCUMENTS 5,796,827 A * 8/1998 Coppersmith ....... A61B 5/0024
380/265
6,580,356 B1 6/2003 Alt et al.
(Continued)

FOREIGN PATENT DOCUMENTS

| EP | 2018038 A2 | 1/2009 |
| EP | 2378748 A1 | 10/2011 |
| EP | 2600319 A1 | 6/2013 |
| JP | 2008073462 A | 4/2008 |

(Continued)

OTHER PUBLICATIONS

International Search Report from corresponding International Patent Application No. PCT/IB2015/058451, dated Feb. 5, 2016.
The Nymi White Paper dated Nov. 19, 2013, Bionym, published online at: https://www.nymi.com/wp-content/uploads/2013/11/NymiWhitePaper-1.pdf.

*Primary Examiner* — Richard Hong
(74) *Attorney, Agent, or Firm* — Tucker Ellis LLP

(57) ABSTRACT

The present disclosure provides for a methods and devices for interaction with one or several users, where each user carries at least one personal communication device which is Body Coupled communication, BCC, enabled. A communication device comprises screen which displays information comprising user interface components and the communication device comprises a BCC enabled selection indication means and the users uses the selection indication means to make selection indications of user interface components. A method of the communication device comprises registering a selection indication, determining the position of the selection indication, identifying a user interface component associated with the position, sending a BCC send signal through the selection indication means comprising a first information associated with the identified user interface component, receiving a BCC response from a personal communication device, comprising a second information associated with the identified user interface component and initiating an action based on the second information.

16 Claims, 10 Drawing Sheets

(51) Int. Cl.
*G06F 3/147* (2006.01)
*G06F 3/0488* (2013.01)
*G06F 3/044* (2006.01)

(52) U.S. Cl.
CPC ............ *G06F 1/1698* (2013.01); *G06F 3/044* (2013.01); *G06F 3/0488* (2013.01); *G06F 3/147* (2013.01)

(58) Field of Classification Search
CPC ... G06F 1/1643; G06F 1/1698; H04B 13/005; G06K 9/00013
See application file for complete search history.

(56) References Cited

U.S. PATENT DOCUMENTS

| | | | |
|---|---|---|---|
| 7,202,773 B1 | 4/2007 | Oba et al. | |
| 2005/0008148 A1 | 1/2005 | Jacobson | |
| 2005/0243061 A1 | 11/2005 | Liberty et al. | |
| 2007/0145119 A1 | 6/2007 | Rhelimi | |
| 2007/0282783 A1 | 12/2007 | Singh | |
| 2008/0263630 A1* | 10/2008 | Harada | G06F 21/629 726/2 |
| 2009/0094681 A1 | 4/2009 | Sadler et al. | |
| 2009/0247080 A1* | 10/2009 | Falck | H04B 13/005 455/41.2 |
| 2010/0277435 A1 | 11/2010 | Han et al. | |
| 2010/0289673 A1* | 11/2010 | Kim | H04B 13/005 341/20 |
| 2011/0205156 A1 | 8/2011 | Gomez et al. | |
| 2011/0227856 A1* | 9/2011 | Corroy | H04B 13/005 345/173 |
| 2012/0026129 A1 | 2/2012 | Kawakami | |
| 2012/0113051 A1* | 5/2012 | Bird | H04B 13/005 345/174 |
| 2012/0249409 A1 | 10/2012 | Toney et al. | |
| 2012/0324368 A1 | 12/2012 | Putz et al. | |
| 2013/0021278 A1* | 1/2013 | Landau | G06F 3/044 345/173 |
| 2013/0174049 A1 | 7/2013 | Townsend et al. | |
| 2014/0085050 A1 | 3/2014 | Luna | |
| 2015/0363631 A1* | 12/2015 | Holz | G06K 9/00013 345/173 |
| 2016/0050516 A1* | 2/2016 | Visweswara | H04B 13/005 455/41.2 |

FOREIGN PATENT DOCUMENTS

| | | |
|---|---|---|
| JP | 2009049951 A | 3/2009 |
| WO | 2010/136932 A1 | 12/2010 |
| WO | 2011021531 A1 | 2/2011 |
| WO | 2013/136119 A1 | 9/2013 |
| WO | 2014/095947 A1 | 6/2014 |

* cited by examiner

USABILITY USING BCC ENABLED DEVICES

TECHNICAL FIELD

The present disclosure relates generally to a system with a communication device comprising a screen and a personal communication device, and particularly to methods and a system for interaction with one or several users, where each user carries at least one personal communication device which is Body Coupled communication, BCC, enabled.

BACKGROUND

In office environments most people carry their own laptop. But this is a diminishing behaviour. Sales of laptops are decreasing while sales of phones, phablets or tablets are increasing. Laptops are big and cumbersome to carry and the need for local storage is decreasing due to that services are increasingly being stored in the cloud.

In the near future, it is expected that office environments are much more flexible than they are today. People will have their phone (or phablet or tablet), and no laptop and when they need a larger screen they will find one and use it. We will see that people only carry their phone (or phablet or tablet), to a screen and use it. The future is already here, it is just unevenly distributed. Already today at work environments, with the flexible seating of plug and play desks, people find a screen and use it. But employees still need to carry their laptop and plug it in at docking stations or connect all the cables.

The behaviour of using a large screen with your phone will then expand to not only be within the office firewalls and secure intranet. The inventors expect people to use larger screens also in public places, when they have a need of it.

Coming from a quite different use case, and almost from a different time era, the internet café served a similar purpose in the 90's. People were traveling in foreign countries and did not have access to internet or to a portable device to be able to read their emails. At an internet café they could enter their credentials, e.g. a Hotmail address and the password, in a web browser and get access to their services. For reading personal mail, this was appropriately safe, but for enterprise services it lacked the required security. There was always a risk that the PC used in an intranet café recorded the credentials of the user.

The inventors foresee that displays will increasingly be touch screens, since touch screens brings a usability that exceeds the non-touch screens.

In summary, the future holds that people will use smaller devices, such as phone, phablets and tablets, which have a negative impact of usability and productivity. People will want to use larger screens temporarily, when they are available. A problem with using temporary screens is the usability; the first time a person uses a specific screen it may take some time before the user finds what he/she needs. In a public area, on a public screen, there is always the problem with security; how to avoid that credentials are stored on the touch screen.

SUMMARY

An object of the present disclosure is to provide methods and devices which improves the usability of devices with screens, especially public devices with screens, and also improves the security for the users that use such screens.

These and further objects are achieved by methods and communication devices which utilizes Body Coupled Communication, BCC, for communicating selection indications between devices. More specifically, the disclosure provides for methods and devices for communicating information regarding the activity on a screen by a user with BCC, via a selection indication means, for improving the interaction between the user and the device with the screen.

The present disclosure is defined by the appended claims. Various advantageous embodiments of the disclosure are set forth by the appended claims as well as by the following description and the accompanying drawings.

According to some aspects the disclosure provides for a method, performed in a communication device comprising a screen, for interaction with one or several users. Each user carries at least one personal communication device which is Body Coupled communication, BCC, enabled. The screen displays, to the one or several users, information comprising one or several user interface components. The communication device comprises a selection indication means which is BCC enabled and the one or several users uses the selection indication means to make selection indications of user interface components on the screen.

According to some aspects, the method comprises:
registering a selection indication on the screen;
determining the position of the selection indication on the screen;
identifying a user interface component of the one or several user interface components which is associated with the position;
sending a BCC send signal through the selection indication means comprising a first information associated with the identified user interface component;
receiving a BCC response signal through the selection indication means, in response to the BCC send signal, from one of the personal communication devices, comprising a second information associated with the identified user interface component; and
initiating an action based on the second information.

By using this method, an enhanced user experience is provided for a user using a communication device with a screen. The communication device comprising a screen communicates first information to a personal communication device of the user making a selection indication on the screen and the personal communication device responds to the communication with second information. The communication device comprising the screen performs an action based on the received second information and thus the communication device comprising the screen performs an action that is customised after the response from the personal communication device. Hence, the action is customised for the current user of the screen.

According to some aspects, the identified user interface component is one of: an application icon, a button, a text field, a menu item, an application window, a content of an application window, an item in an application window, a specified area of the touch screen, an image, a video. Thus, the first and second information is associated with an item displayed on the screen. In other words, the communication device comprising the screen communicates to the personal communication device what item has been indicated on the screen and the personal communication device responds with information associated with that item. Thus, the initiated action is based on what user interface component has been indicated. If an identified user interface component is for example an application icon for a writing application, the second information is for example personal settings for that writing application from the personal communication device. The writing application can then be started on the screen with the personal settings of the person who started the application.

According to some aspects, the selection indication means is a touch screen and the selection indication is a touch on the touch screen and wherein the sending and receiving comprises sending and receiving BCC signals through the touch screen. When the selection indication means is a touch screen it is possible to communicate via BCC through the screen. A user does not need to use any other means than a finger or other body part to make selection indications on the screen. In, for example, a public area, using a public touch screen utilising the method, a user may use the touch screen with personal settings or information without having to manually insert them into the system.

According to some aspects, the selection indication means is a mouse and the selection indication is a mouse cursor over a user interface component or a mouse click on a user interface component or the selection indication means is a keyboard and the selection indication is the press of a key on the keyboard at a selected area. In some cases, touch screens are considered to be too costly. Then the method may be used with a communication device with a BCC enabled mouse or keyboard. If a user wants to write long texts, it may be more time efficient to use a keyboard instead of a touch screen.

According to some aspects, the method comprises:
confirming that the selection indication is performed by a user carrying the BCC enabled personal communication device by receiving at least one BCC signal from the personal communication device in connection with the registered selection indication on the screen.

By knowing that the personal communication device is BCC enabled, the communication device may proceed accordingly.

According to some aspects, the method comprises:
communicating, to an application associated with the identified user interface component, that a selection indication has taken place on the identified user interface component and that the selection indication was performed by a user carrying the BCC enabled personal communication device; and
receiving, from the application, third information associated with the use of the application.

In other words, an application is informed that a component of it has been indicated and it may send information regarding the use of the application. The sent information may for example be a request for settings of log in credentials for that application.

According to some aspects, the first information associated with the identified user interface component comprises fourth information associated with the received third information associated with the use of the application. The communication device sends, in the BCC send signal, information associated with the use of the application. In other words, the application may indirectly request information from the personal communication device. It may also provide information regarding what settings or what user information would be useful from the personal communication device.

According to some aspects, the third information associated with the use of the application comprises a security challenge, from the application, associated with accessing the identified user interface component and wherein the received second information comprises a response to the security challenge and wherein the initiated action comprises to send the response to the security challenge to the application. In this manner, a way to securely log on to an application without storing any log in credentials on the communication device is provided. Only encrypted information is passed over the communication device.

According to some aspects, the third information associated with the use of the application comprises a request for device specific information associated with the use of the application and wherein the second information comprises the requested device specific information associated with the use of the application. Thus, the application may request for example settings from the personal communication device for the use of the application. The settings are for example camera settings that are preferred by the user.

According to some aspects, the first information associated with the identified user interface component comprises information that identifies the identified user interface component. This is so that the personal communication device may choose application specific information to send as the second information.

According to some aspects, the first information associated with the identified user interface component comprises a request for the second information associated with the identified user interface component. In other words, the communication device comprising a touch screen may specify what information it wants in the second information.

According to some aspects, the method comprising:
receiving identification information from the personal communication device via BCC at the selection indication on the screen.

By identifying the personal communication device via BCC at the touch, it is possible to distinguish between multiple users.

According to some aspects the disclosure provides for a method, performed in a personal communication device, for interaction with a communication device comprising a screen for interaction with one or several users. Each user carries at least one personal communication device and wherein the personal communication device is Body Coupled communication, BCC, enabled. The screen displays, to the one or several users, information comprising one or several user interface components and wherein the communication device comprises a selection indication means which is BCC enabled and the one or several users uses the selection indication means to make selection indications of user interface components on the screen.

According to some aspects, the method comprises:
receiving a BCC send signal through the selection indication means and via the body of a user of the personal communication device comprising first information associated with an identified user interface component of the one or several user interface components; and
sending a BCC response signal, in response to the received BCC send signal, through the selection indication means comprising second information associated with the identified user interface component;

By communicating the second information to the communication device with the screen, it is possible to personalize the usage of the screen. The second information is for example log in information or personal settings associated with the user interface component.

According to some aspects the disclosure provides for a method, performed in a system of a personal communication device and a communication device comprising a screen, for interaction with one or several users. Each user carries at least one personal communication device which is Body Coupled Communication, BCC, enabled. The screen displays, to the one or several users, information comprising one or several user interface components and wherein the communication device comprises a selection indication means which is BCC enabled and the one or several users uses the selection indication means to make selection indications of user interface components on the screen.

According to some aspects, the method comprises:
registering, in the communication device, a selection indication on the screen;
determining, in the communication device, the position of the selection indication on the screen;
identifying, in the communication device, a user interface component of the one or several user interface components which is associated with the position;
sending a BCC send signal through the selection indication means comprising a first information associated with the identified user interface component;
receiving, in the personal communication device, the BCC send signal through the selection indication means and via the body of a user of the personal communication device comprising first information associated with the identified user interface component;
sending, in the personal communication device, a BCC response signal, in response to the received BCC send signal, through the selection indication means comprising second information associated with the identified user interface component;
receiving a BCC response signal through the selection indication means, in response to the BCC send signal, from one of the personal communication devices, comprising a second information associated with the identified user interface component; and initiating, in the communication device, an action based on the second information.

The system performs a combined method of the methods of the communication device and the personal communication device as described above and the advantages have been previously described.

According to some aspects the disclosure provides for a communication device comprising a screen, configured to interact with one or several users. Each user carries at least one personal communication device which is Body Coupled communication, BCC, enabled. The screen displays, to the one or several users, information comprising one or several user interface components and wherein the communication device comprises a selection indication means which is BCC enabled and the one or several users uses the selection indication means to make selection indications of user interface components on the screen. The communication device comprises communication circuitry and processing circuitry.

According to some aspects, the processing circuitry is configured to:
register a selection indication on the screen;
determining the position of the selection indication on the screen;
identify a user interface component of the one or several user interface components which is associated with the position;
send a BCC send signal through the selection indication means comprising a first information associated with the identified user interface component;
receive a BCC response signal through the selection indication means, in response to the BCC send signal, from one of the personal communication devices, comprising a second information associated with the identified user interface component; and
initiate an action based on the second information.

The advantages have been previously discussed.

According to some aspects the disclosure provides for a personal communication device configured to interact with a communication device comprising a screen for interaction with one or several users. Each user carries at least one personal communication device and wherein the personal communication device is Body Coupled communication, BCC, enabled. The screen displays, to the one or several users, information comprising one or several user interface components and wherein the communication device comprises a selection indication means which is BCC enabled and the one or several users uses the selection indication means to make selection indications of user interface components on the screen. The personal communication device comprises communication circuitry and processing circuitry.

According to some aspects, the processing circuitry is configured to:
receive a BCC send signal through the selection indication means and via the body of a user of the personal communication device comprising first information associated with an identified user interface component of the one or several user interface components; and
send a BCC response signal, in response to the received BCC signal, through the selection indication means comprising second information associated with the identified user interface component;

The advantages have been previously discussed.

According to some aspects the disclosure provides for a system comprising a communication device comprising a screen and a personal communication device, configured to interact with one or several users. Each user carries at least one personal communication device which is Body Coupled Communication, BCC, enabled. The screen displays, to the one or several users, information comprising one or several user interface components. The communication device comprises a selection indication means which is BCC enabled and the one or several users uses the selection indication means to make selection indications of user interface components on the screen, wherein the communication device comprises communication circuitry and processing circuitry. The processing circuitry is configured to:
register a selection indication on the touch screen;
determining the position of the selection indication on the screen;
identify a user interface component of the one or several user interface components which is associated with the position;
send a BCC send signal through the selection indication means comprising a first information associated with the identified user interface component;
receive a BCC response signal through the selection indication means, in response to the BCC send signal, from one of the personal communication devices, comprising a second information associated with the identified user interface component;
initiate an action based on the second information; and The personal communication device comprises communication circuitry and processing circuitry. The processing circuitry is configured to:
receive a BCC send signal through the selection indication means and via the body of a user of the personal communication device comprising first information associated with an identified user interface component of the one or several user interface components; and
send a BCC response signal, in response to the received BCC signal, through the selection indication means comprising second information associated with the identified user interface component;

The advantages have been previously discussed.

According to some aspects the disclosure provides for a computer readable program, which, when executed on a communication device, causes the communication device to perform the method according to above.

According to some aspects the disclosure provides for a computer readable program, which, when executed on a personal communication device, causes the personal communication device to perform the method according to above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
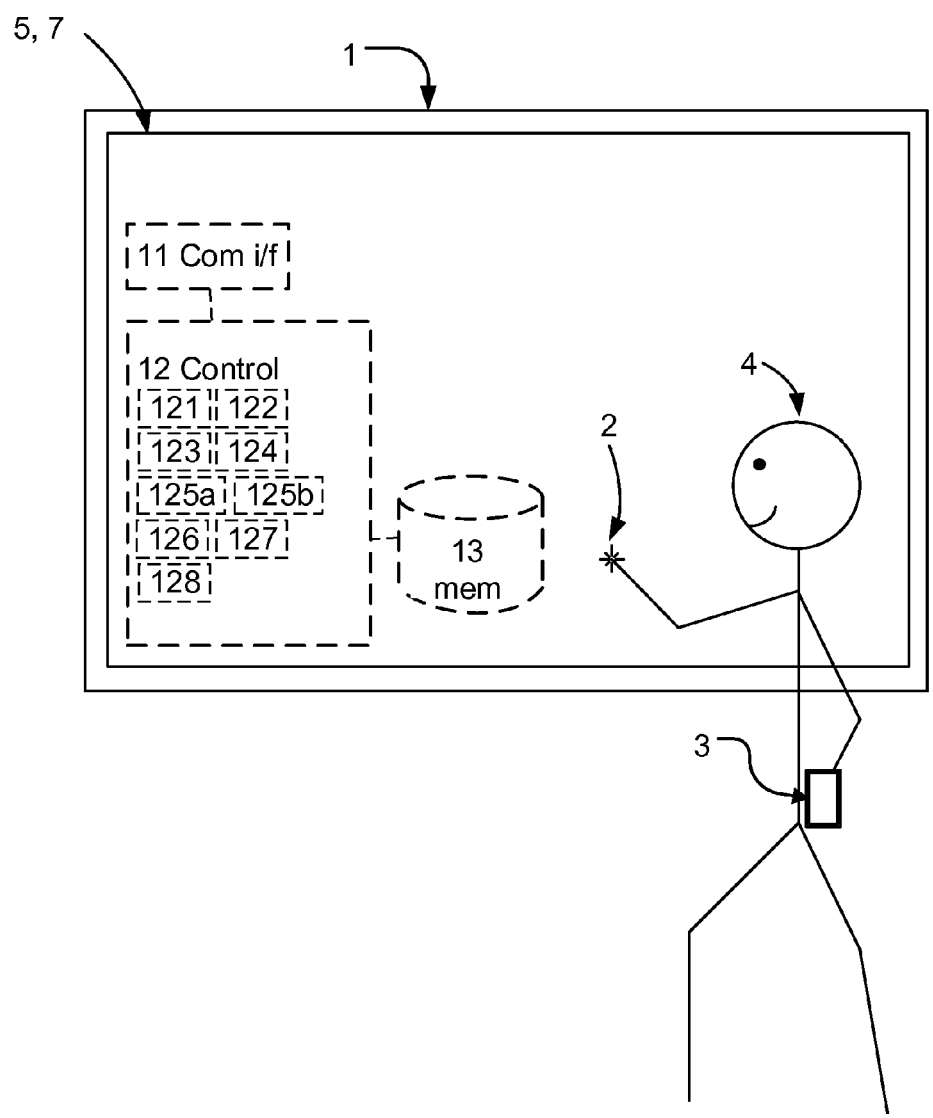
FIG. 1 illustrates an example of a communication device with a touch screen and a user with a personal communication device using the screen

Aspects of the present disclosure will be described more fully hereinafter with reference to the accompanying drawings. The methods and devices disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Embodiments of the present disclosure will be exemplified using a personal communication device such as a mobile phone. However, it should be appreciated that the disclosure is as such equally applicable to any personal communication devices which have communication capabilities. Examples of such devices may for instance be any type of mobile phone, smartphone, laptop (such as standard, ultra-portables, netbooks, and micro laptops), handheld computers, portable digital assistants, tablet computers, touch pads, gaming devices, accessories to mobile phones, e.g. wearables in the form of headphones/-sets, visors/ goggles, bracelets, wristbands, necklaces, watches, headbands, rings, etc. The communication device will be exemplified with a communication device with a big screen for multiple users but the disclosure is equally applicable to any communication device with a screen showing user interface components and where the device is Body Couple Communication, BCC, enabled at a selection indication means.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Body-Coupled Communications, BCC, also referred to as Body-Based Communication, BBC or Near-Body Communication, NBC, has been proposed as a promising alternative to radio frequency, RF, communication as a basis for Body/ Personal Area Network, BAN/PAN, communication. BCC allows for an exchange of information between a plurality of devices which are in contact with or in close proximity of a living body. This can be achieved by the transmitting BCC-/BAN-antenna that provide a capacitive or galvanic coupling of low-energy electrical fields onto the body surface, i.e. leakage currents with a small magnitude is set to spread out over the human body. The small currents are then detected by a receiver BCC-/BAN-antenna, located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-/BAN-antennas is very low.

BCC/BBC is no new technique, and it has previously been employed within the fields of e.g. medical sensor devices and exercise sensors. Within these fields, sensors attached to the users skin or worn in the close proximity of the body is employed for monitoring different body functions in order to keep track of medical status or fitness parameters of the user. To send the collected data to a central unit e.g. BCC/BBC can be utilized.

The proposed technique will now be described referring to FIGS. 1-15. As previously discussed, the disclosure provides for a method and device for initiating situational based communication actions in the communication device 1.

FIG. 1 illustrates an example use case of the present disclosure. A user 4, with a personal communication device 3 on, or in the vicinity of, his/her body, touches the touch screen or a communication device 1 at a touch point 2. The two devices will then perform methods with which the communication device receives information regarding the user interface component that the user has touched from the personal communication device that the communication device uses to perform an action. An example of an action is to load personal settings of the user from the personal communication device to the communication device regarding the specific user interface component.

Figure 2:
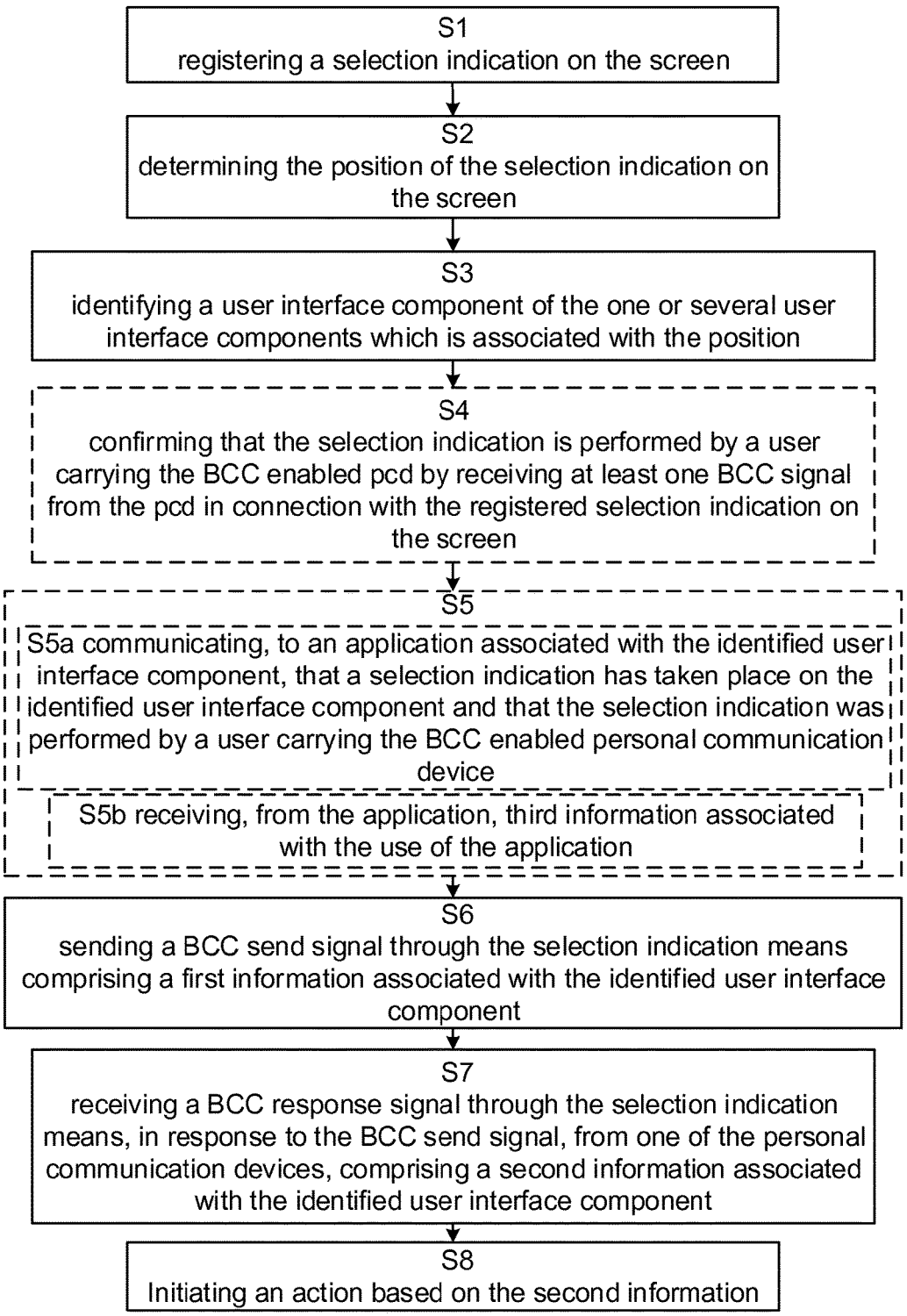
FIG. 2 is a flow chart illustrating the proposed method, performed in the communication device
Figure 3:
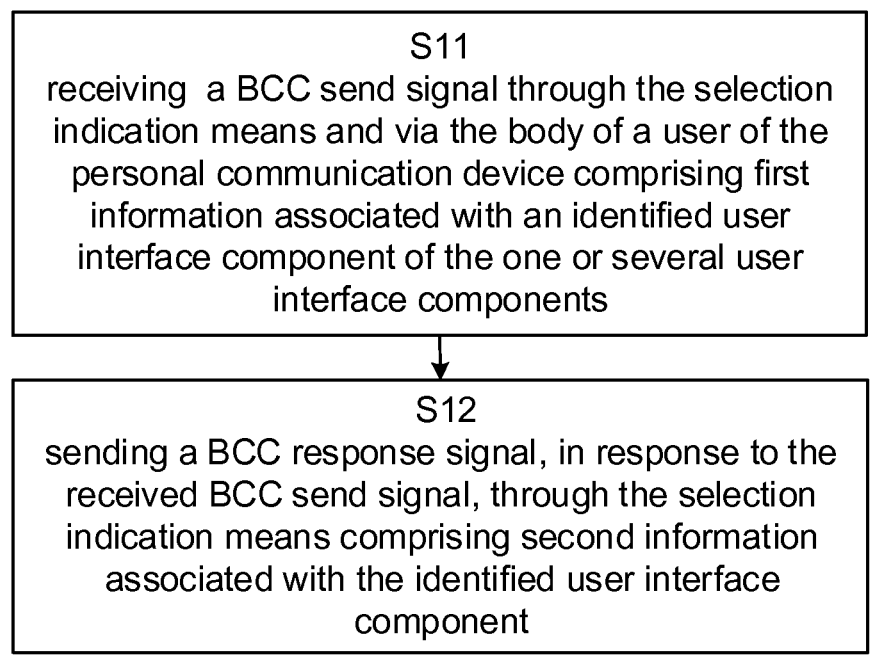
FIG. 3 is a flow chart illustrating the proposed method, performed in the personal communication device.
Figure 10:
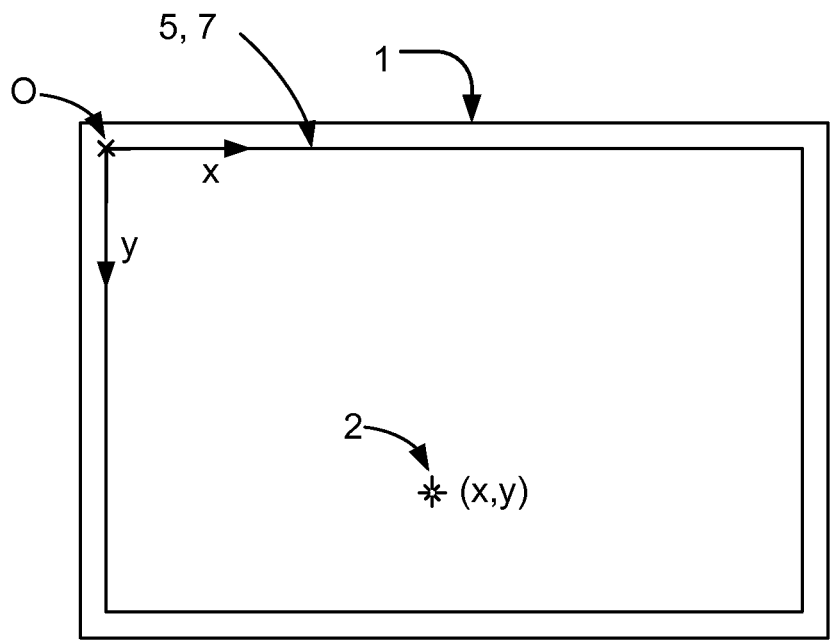
FIG. 10 illustrates an example of position calculation on a touch screen using a coordinate system
Figure 11:
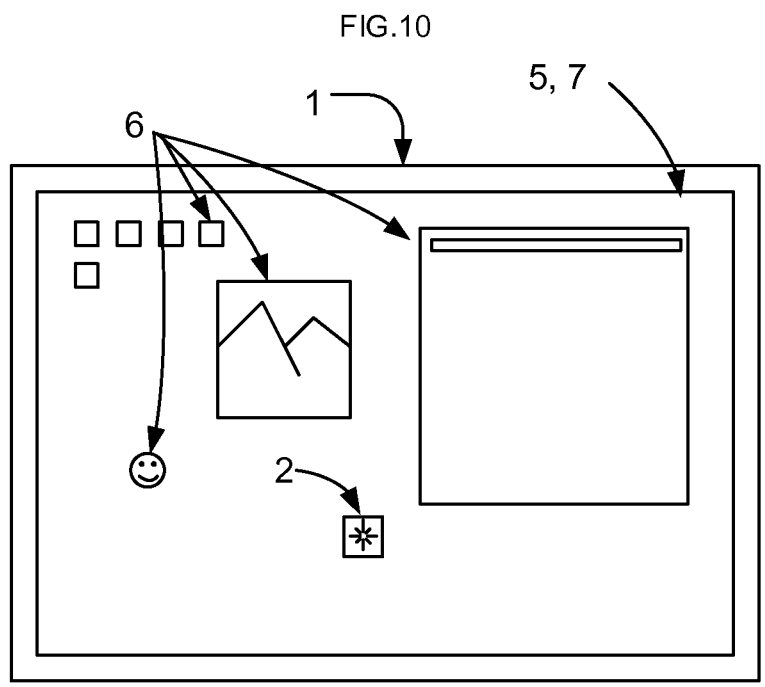
FIG. 11 illustrates an example of a screen showing several different examples of user interface components
Figure 12:
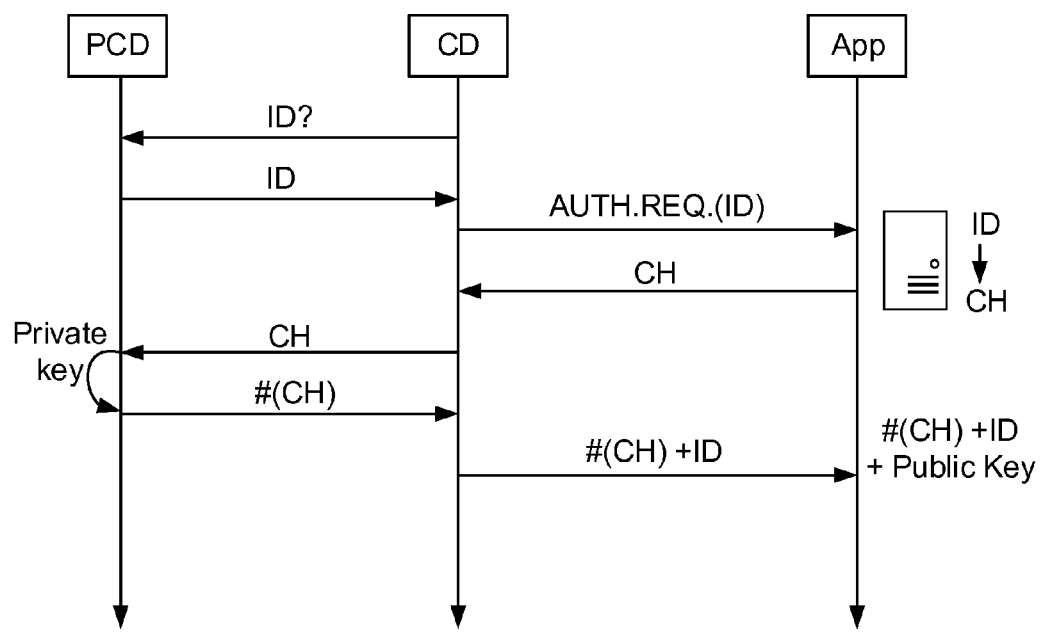
FIG. 12 illustrates an example of a communication scheme when using challenges and encrypted messages
Figure 13:
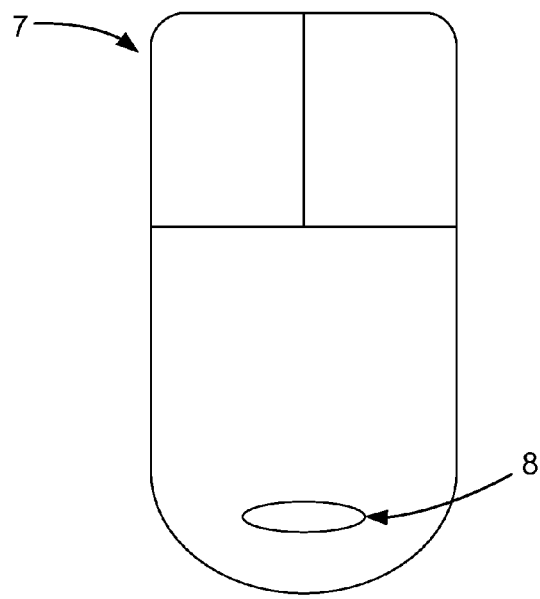
FIG. 13 illustrates an example of a BCC enabled mouse
Figure 14:
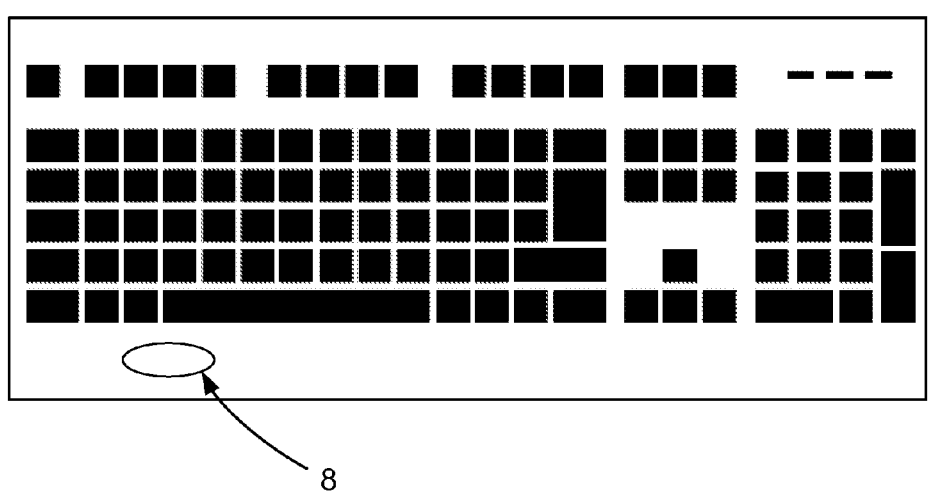
FIG. 14 illustrates an example of a BCC enabled keyboard
Figure 15:
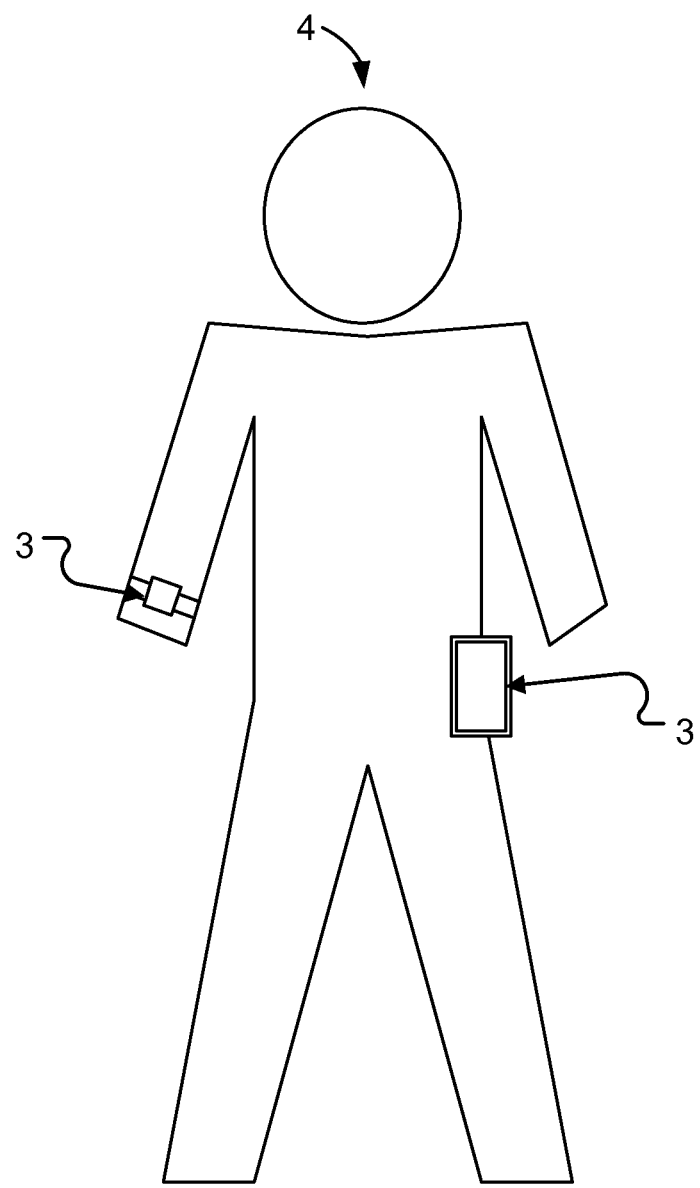
FIG. 15 illustrates an example of a user with two personal communication devices

FIG. 2 is a flow diagram depicting example operations which may be taken by the communication device 1 and FIG. 3 is a flow diagram depicting example operations which may be taken by the personal communication device 3. Examples of the personal communication device are seen in FIGS. 4-9. FIG. 10 illustrates an example of how to determine a position of a screen, FIG. 11 illustrates a screen with different examples of user interface components and FIG. 12 illustrates a communication scheme between a personal communication device, the communication device and an application according to some aspects of the disclosure. FIGS. 13 and 14 illustrates examples of selection indication means in the form of a mouse and a keyboard. FIG. 15 illustrates a case when a user 4 carries two personal communication devices.

It should be appreciated that FIG. 2 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

The communication device 1 comprises a screen 5 and is configured to interact with one or several users 4. Each user carries at least one personal communication device 3 which is Body Coupled communication, BCC, enabled. The screen displays, to the one or several users, information comprising one or several user interface components 6 and wherein the communication device comprises a selection indication means 7 which is BCC enabled and the one or several users uses the selection indication means to make selection indications of user interface components on the screen. The communication device comprises communication circuitry 11 and processing circuitry 12. The communication device further comprises a memory 13 for storing data. The memory may be any type of memory suitable for a wireless communication device. Connected to the communication circuitry is an antenna arrangement for communicating with other communication devices.

The personal communication device 3 is configured to interact with a communication device 1 comprising a screen 5 for interaction with one or several users 4. Each user carries at least one personal communication device and the personal communication device is Body Coupled communication, BCC, enabled. The screen displays, to the one or several users, information comprising one or several user interface components 6 and the communication device comprises a selection indication means 7 which is BCC enabled and the one or several users uses the selection indication means to make selection indications of user interface components on the screen. The personal communication device comprises communication circuitry 21 and processing circuitry 22. The personal communication device further comprises a memory 23 for storing data. The memory may be any type of memory suitable for a wireless communication device. Connected to the communication circuitry is an antenna arrangement for communicating with other communication devices.

A user interface component is a well-known concept for the person skilled in the art and is any item presented to users on the screen. A user interface component is for example an application icon, an application window or a button or field in an application window. A user interface component may be any item displayed on the screen, such as a menu, a menu item etc.

The method, performed in the communication device 1, illustrated in FIG. 2, comprises registering S1 a selection indication on the screen. The selection indication is performed with the selection indication means. The processing circuitry 12 is configured to register S1 a selection indication on the screen. According to some aspects, the processing circuitry comprises a registration means 121 for registering. The selection indication is for example a touch on the screen, wherein the screen is a touch screen, a click on the screen with a cursor controlled with a mouse or mouse pad, a registration of the position of the mouse cursor without a click, a click using a keyboard or an indication on the screen, the screen being a touch screen, using a stylus. In other words, the selection indication means is a touch screen, a mouse, a keyboard or a stylus which is BCC enabled. It should be noted that when the selection indication means is a mouse the cursor is used to make a selection indication but the selection indication is not necessarily a "click" with the mouse but may be just the location of the cursor without the click. According to some aspects, the selection indication is made during a movement of the selection indication means. If the movement is performed from one user interface component to another, the following steps may be used with a combination of two or several identified user interface components.

The method, performed in the communication device 1, further comprises determining S2 the position 2 of the selection indication on the screen. The processing circuitry 12 is configured to determine S2 the position 2 of the selection indication on the screen. According to some aspects, the processing circuitry comprises a determiner 122 for determining. The position of the selection indication is for example an absolute coordinate on the touch screen. FIG. 10 illustrates an example where a position on a screen is given in coordinates (x, y) where the origin is in the upper left corner. The origin may also be positioned in any other corner. Another example is to use relative coordinates on the screen where the position is given in relation to something else on the screen.

The method, performed in the communication device 1, further comprises identifying S3 a user interface component 6 of the one or several user interface components which is associated with the position 2. The processing circuitry 12 is configured to identify S3 a user interface component of the one or several user interface components which is associated with the position. According to some aspects, the processing circuitry comprises an identifier 123 for identifying. The communication device uses the determined position to identify the user interface component which is associated with the position at the time of the selection indication. According to some aspects, the identified user interface component is one of: an application icon, a button, a text field, a menu item, an application window, a content of an application window, an item in an application window, a specified area of a touch screen, an image, a video. If the position is in an application window it may be the application itself that determines what specific user interface component has been indicated in the application window.

There may be some initiating communication between the communication device 1 and the personal communication device 3. According to some aspects, the method comprises confirming S4 that the selection indication is performed by a user carrying the BCC enabled personal communication device by receiving at least one BCC signal from the personal communication device in connection with the registered selection indication on the screen. The processing circuitry 12 is configured to confirm that the user is carrying a BCC enabled personal communication device. According to some aspects, the processing circuitry comprises a confirming means 124 for the confirming. The confirmation may be received upon a request from the communication device or without a request. According to some aspects the received signal comprises information that identifies the device. By knowing that the personal communication device is BCC enabled, the communication device may proceed accordingly.

To make sure that the user touches the selection indication means long enough for BCC signalling to be handled the graphical user interface of the screen may be arranged to indicate if the user needs to prolong the touch. The BCC communication between the communication device 1 and the personal communication device 3 will take some amount of time. If the system is set up so that there will be several communications in both directions, the communication time may exceed the time it takes for the user to make a selection indication using the selection indication means. If the user lets go of the selection indication means the BCC connection is broken. According to some aspects, the graphical interface of the screen is providing an indication that the user needs to hold on to the selection indication means for longer than necessary to make a selection indication. In the future, it may very well be that the BCC communication is so fast that a prolonged hold on the selection indication means is unnecessary. According to some aspects the graphical interface uses graphics to entice the user to prolong his/her hold or to resume the hold if he/she has already let go but there is still BCC communication to send/receive. An example of such graphics is that a graphical animation is displayed in connection to the selection indication position which is some kind of countdown to show the user that he/she has to hold the connection. Another example is that a new button may appear that entices the user to make a new selection indication on the screen, during which BCC communication is performed. Another example is to use a kind of "slide-to-unlock" graphic that ensures prolonged contact with the user by making the user do a dragging movement on the screen. A further example is that if a user releases the selection indication means before all required BCC communication has taken place, the communication device may indicate this by a message on the screen or by simply going back to a start page of the screen.

If the user interface component is associated with a specific application, the application may be involved in the method. According to some aspects, the method comprises communicating S5*a*, to an application associated with the identified user interface component, that a selection indication has taken place on the identified user interface component and that the selection indication was performed by a user carrying the BCC enabled personal communication device and receiving S5*b*, from the application, third information associated with the use of the application. The processing circuitry 12 is configured to communicate S5*a* to the application, that a selection indication has taken place and to receive S5*b* the information. According to some aspects, the processing circuitry comprises a communication means 125*a* for communicating and a receiver 125*b* for the receiving. The term application is here used as software that performs coordinated functions, tasks or activities on the device. The application may be a locally stored application or an application which is run from a remote server. The communication device then communicates with the remote server. According to some aspects, the communication does not comprise specific information that the selection indication was performed by a user carrying a BCC enabled device. Such information may for example be implicit. Information associated with the use of the application is for example a security challenge to securely log in to the application. Another example of information associated with the use of the application is a request for user specific settings of the application, and ID of the personal communication device or information regarding a specific product indicated in a movie or image. The information may be any information that has anything to do with the use of the application or of the content of the application.

In other words, an application is informed that a component of it has been indicated and it may send information regarding the use of the application. The user interface component may be an application icon or any content in the application such as a text field, image field, a button, a specific part of a video or image, such as an item in the image or video, etc. and the third information associated with the use of the application may then be associated with the use of the specific component of the application. The sent information may for example be a request for settings of log in credentials for that application.

The method, performed in the communication device 1, comprises sending S6 a BCC send signal through the selection indication means comprising a first information associated with the identified user interface component. The processing circuitry 12 is configured to send S6 the BCC send signal through the selection indication means comprising a first information associated with the identified user interface component via the communication circuitry 11. According to some aspects, the processing circuitry comprises a sender 126 for sending. According to some aspects, the communication device and the personal communication device performs a handshake before this and possibly also pairs. It is irrelevant to the disclosure which device initiates the communication. It may be that the personal communication device sends a BCC signal as soon as the user touches the selection indication means or it may be the communication device. The first information comprises data which is associated with the identified user interface component. The first information may be any information associated with the user interface component or comprising a request for some other information associated with the user interface component from the personal communication device. The first information is for example in the form of a keyword, indicating what user interface component has been indicated.

The method, performed in the communication device 1, comprises receiving S7 a BCC response signal through the selection indication means, in response to the BCC send signal, from one of the personal communication devices 3, comprising second information associated with the identified user interface component. The processing circuitry 12 is configured to receive S7 the BCC response signal through the selection indication means, in response to the BCC send signal, from one of the personal communication devices 3, comprising a second information associated with the identified user interface component via the communication circuitry 11. According to some aspects, the processing circuitry comprises a receiver 127 for receiving. The first and second information is associated with an item, i.e. a user interface component, displayed on the screen. In other words, the communication device comprising the screen communicates to the personal communication device what item has been indicated on the screen and the personal communication device responds with information associated with that item. An example of the first information is information regarding that a specific part of the screen has been indicated and the responding second information is then for example identifying information of the personal communication device which is used to allow access to that specific part of the screen. In other words, a part of the screen may be dedicated for predetermined users and those users are identified using the method. The second information is information that is associated to the user interface component. The second information is, according to some aspects, associated with the specific identified user interface component and with the specific personal communication device or with the user of the personal communication device. In other words, the second information may be user specific information.

The method, performed in the communication device 1, comprises initiating S8 an action based on the second information. The processing circuitry 12 is configured to initiate S8 the action based on the second information. According to some aspects, the processing circuitry comprises an initiator 128 for initiating the action. The action is for example log in to an indicated application, to start an application with user specific settings, to update an application using the second information, to activate a part of the screen, to store data in the personal communication device, to send data to the personal communication device, to get data from the personal communication device. Thus, the initiated action is based on what user interface component has been indicated. If an identified user interface component is for example an application icon for a writing application, the second information is for example personal settings for that writing application from the personal communication device. The writing application can then be started on the screen with the personal settings of the person who started the application. An example of a use case of the described method is when a user touches a text field in a web page and the text field is then automatically filled with text coming from the personal communication device (e.g. a name, address, username etc.). Another example is when a user types on an onscreen keyboard. As the typed text updates is sent to the personal communication device as the first information or part of the first information, the personal communication device responds with completion or correction suggestions in the second information, which are presented to the user.

When the initiated action is for example to log in to an application and the communication between the devices 1, 3 takes time due to many transfers between them the graphical interface that is intended to prolong the BCC connection between the user and the selection indication means may be for example to show a text, such as "please hold while login in" on the screen. This will give the system time to perform time consuming communications, if needed. A user may also be instructed to touch the selection indication means again by a message on the screen if further communication is required.

By using this method, an enhanced user experience is provided for a user 4 using a communication device 1 with a screen 5. The communication device 1 comprising a screen communicates first information to a personal communication device 3 of the user making a selection indication on the screen and the personal communication device responds to the communication with second information. The communication device comprising the screen performs an action based on the received second information and thus the communication device comprising the screen performs an action that is customised after the response from the personal communication device. Hence, the action is customised for the current user of the screen.

The selection indication means 7 is for example a touch screen 5, 7 and the selection indication is a touch on the touch screen and wherein the sending S6 and receiving S7 comprises sending and receiving BCC signals through the touch screen. In other words, the touch screen is BCC enabled for sending and receiving BCC signals. BCC screens are known and comprise for example a separate BCC antenna element in the screen or utilize the capacitors of a capacitive touch screen. The touch screen comprises a BCC transceiver configured for sending and/or receiving BCC signals. The touch screen is for example a capacitive touch screen and the BCC transceiver utilizes the capacitors of the capacitive touch screen as BCC transceivers. The important feature for the present disclosure is that a BCC screen may communicate with the personal communication device 3 when the user 4 is touching the touch screen. In other words, when the selection indication means is a touch screen it is possible to communicate via BCC through the screen. A user does not need to use any other means than a finger or other body part to make selection indications on the screen. In, for example, a public area, using a public touch screen utilising the method, a user may use the touch screen with personal settings or information without having to manually insert them into the system. It should be noted that the screen may be a touch screen but the user may use a stylus to navigate the user interface. In such a case the stylus may either be configured to pass a BCC signal between the touch screen and the body of the user or to be BCC enabled by itself.

FIGS. 13 and 14 shows examples of selection indication means 7. According to some aspects, the selection indication means 7 is a mouse and the selection indication is a mouse cursor over a user interface component or a mouse click on a user interface component or the selection indication means 7 is a keyboard and the selection indication is the press of a key on the keyboard at a selected area. In such a case the sending S6 and receiving S7 comprises sending and receiving BCC signals through the mouse or keyboard. In some cases, touch screens are considered to be too costly. Then the method may be used with a communication device with a BCC enabled mouse or keyboard. If a user wants to write long texts, it may be more time efficient to use a keyboard instead of a touch screen. When the selection indication means is a mouse or a keyboard, the mouse or keyboard is BCC enabled. A BCC enabled mouse comprises for example a BCC antenna element 8 somewhere on the mouse where it is most likely that users have continuous body contact with the antenna. Such as at the base of the mouse where the user places his/her heal of the hand or at the left button. A BCC enabled keyboard comprises for example a BCC antenna element 8 somewhere on the keyboard where it is most likely that users have continuous body contact with the antenna. At a keyboard it is for example located on the area below the keys where users rest/lean their hands for support when writing. That the selection indication may be performed with a mouse or keyboard has been previously described.

When the communication device 1 receives third information from an application, the first information associated with the identified user interface component 6 comprises for example fourth information associated with the received third information associated with the use of the application. The communication device sends, in the BCC send signal, information associated with the use of the application that has been received from the application in S5b. In other words, the application may indirectly request information from the personal communication device. It may also provide information regarding what settings or what user information would be useful from the personal communication device. In other words, the application provides information regarding what kind of information would be useful for it, such as settings or log in information. In particular, according to some aspects, the third information associated with the use of the application comprises a security challenge, from the application, associated with accessing the identified user interface component and wherein the received S7 second information comprises a response to the security challenge and wherein the initiated S8 action comprises to send the response to the security challenge to the application. FIG. 12 illustrates an example of a communication scheme when the personal communication device 3, PCD, securely communicates with a communication device 1, CD and an application, App. In the scheme the personal communication device first receives a request of an ID from the Communication device. The request may originate from the application. The communication device sends an authorisation request to the application which comprises the ID. The Application then links the ID to a challenge that is sent to the personal communication device via the communication device. Only the same ID may then authorize the user using the challenge to the application. Note that the challenge may be non-ID specific, i.e. a generic challenge that is sent from the application without linking it to an ID. The personal communication device signs the challenge using a private cryptographic key and the communication device sends back the signature to the application with the ID. The application uses a public cryptographic key to verify the signature from the personal communication device. The encrypted information is thus not possible to retrieve by the communication device. Thus the personal communication device is authenticated. This is for example used when a user has indicated an application that requires log in information. There are, according to some aspects, more steps than those presented here but that is up to the providers to specify what communications are required. The information is encrypted to not reveal security data to the communication device. If the personal communication device cannot answer with requested information the user is denied access to the touched application, the denial is possibly shown on screen. The challenge could be sent earlier and stored in the communication device; this is especially the case if the challenge is generic. In other words, the challenge can be sent directly to the personal communication device upon the first selection indication because the challenge is already in the communication device. In this manner, a way to securely log on to an application without storing any log in credentials on the communication device is provided. According to some aspects, only encrypted information is passed over the communication device when communicating authorization data between the personal communication device and the application.

An example of a use case is when a user comes to a touch screen (e.g. a screen in an internet café, at work, or public screens at other places); the user chooses a service, e.g. Gmail. This can either be through typing http://gmail.com in the browser, or by using an icon with a shortcut to the URL. When the user makes a selection indication, a BCC connection is activated between the user's personal communication device (for example wristband, pocket coin or directly to the phone that the user carries) and the communication device. Through the BCC connection the user's credentials are sent from the device (phone, pocket coin, wristband or other) via the selection indication means and its browser to the corresponding server, e.g. Gmail. And then the user is logged in. So the user does not have to enter and credentials, since they are already available via BCC. According to some aspects, the credentials are not stored on the untrusted screen. This is for example solved by using known techniques such as having the credentials (login id and password) replaced by a certificate holding private and public keys. So when a user enters the Gmail service on the untrusted screen, the users identity is send to the server, which responds with a challenge—e.g. an integer encrypted with the users public key, which in turn is decrypted with the users private key and sent back to the server. If there is a match the user is logged in. It does not help the untrusted screen to save any of the login information that has passed, since the next time the server will send a new challenge, e.g. a new long integer.

According to some aspects, the third information associated with the use of the application comprises a request for device specific information associated with the use of the application and wherein the second information comprises the requested device specific information associated with the use of the application. If the personal communication device 3 cannot answer with requested information the user 4 is for example denied access to the application, the denial is possibly shown on screen. Thus, the application may request for example settings from the personal communication device for the use of the application. The settings are for example camera settings that are preferred by the user, video settings or screen settings.

In some cases, the first information associated with the identified user interface component comprises information that identifies the identified user interface component 6. It may be useful for the personal communication device 3 to know what user interface component has been indicated so that the personal communication device may decide on its own what second information it will reply with. This is so that the personal communication device may choose application specific information to send as the second information.

According to some aspects, the first information associated with the identified user interface component comprises a request for the second information associated with the identified user interface component 6. In other words, the communication device 1 comprising a touch screen may specify what information it wants in the second information. The request may be for example a request for specific cookies, settings, images, contact information, stored data or any kind of information which may be used in association with the indicated user interface component.

Some communication devices 1 are intended to be used by multiple users 4 and it is then an advantage to know which user is doing what. This can be accomplished by identifying the personal communication device 3 through the selection indication means. According to some aspects, the method comprises receiving S1a identification information from the personal communication device via BCC at the selection indication on the screen. The processing circuitry 12 is configured to receive S1a the identification information. According to some aspects, the processing circuitry comprises a receiver 121a for receiving. According to some aspects the personal communication device can get a temporary short ID that is sent at every indication to make the identification faster. According to some aspects all new BCC devices are associated with a short id, to be able to address the right BCC device in case of several devices. In other words, by identifying the personal communication device via BCC at the selection indication, it is possible to distinguish between multiple users.

A benefit with large screens is that they allow multiple simultaneous users 4, but most current applications, e.g. web browsers, are designed for only one user at a time. Using the above described method enables the user currently touching the screen be the one signing in to a service even though another user just used the screen for something else.

The personal communication device performs a corresponding method. The method, performed in the personal communication device 3, comprises receiving S11 a BCC send signal through the selection indication means 7 and via the body of a user of the personal communication device comprising first information associated with an identified user interface component 6 of the one or several user interface components and sending S12 a BCC response signal, in response to the received BCC send signal, through the selection indication means comprising second information associated with the identified user interface component. The processing circuitry 22 is configured to receive S11 the BCC send signal through the selection indication means and via the body of a user of the personal communication device comprising first information associated with an identified user interface component of the one or several user interface components via the communication circuitry 21. According to some aspects, the processing circuitry comprises a receiver 221 for receiving. The processing circuitry 22 is configured to send S12 the BCC response signal, in response to the received BCC signal, through the selection indication means comprising second information associated with the identified user interface component via the communication circuitry 21. According to some aspects, the processing circuitry comprises a sender 222 for the sending. Note that the BCC send signal and the BCC response signal are named according to the method of the communication device to clarify which signal is the corresponding one of the two methods. As previously discussed, there might be some kind of handshake or pairing between the devices prior to these steps.

By communicating the second information to the communication device 1 with the screen 5, it is possible to personalize the usage of the screen, as discussed above when discussing the method of the communication device. The second information is for example log in information or personal settings associated with the identified user interface component. The second information is either a response to a request in the first information or information that the personal communication device decides on its own.

Figure 4:
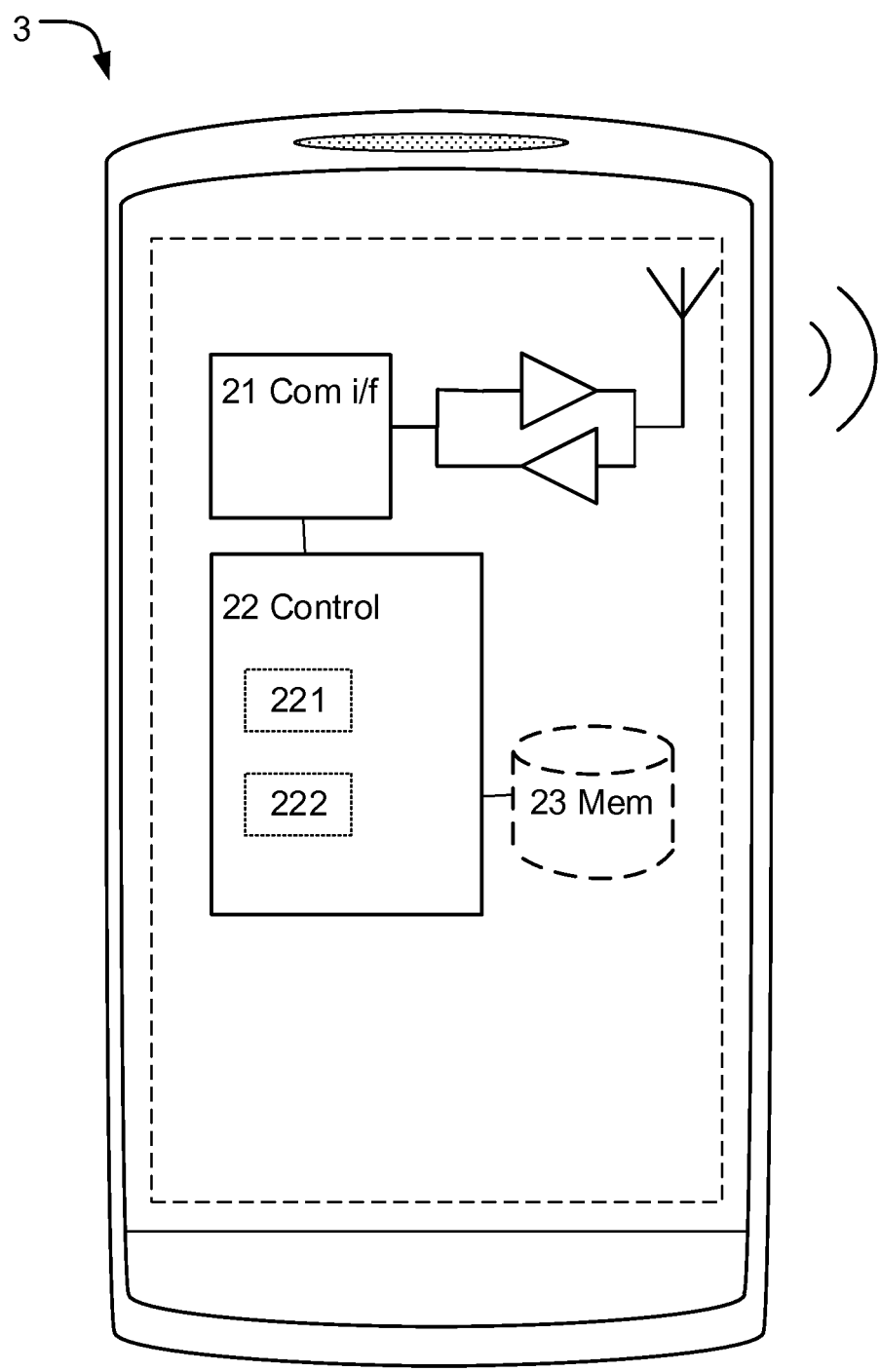
FIGS. 4-9 illustrates examples of personal communication devices
Figure 5:
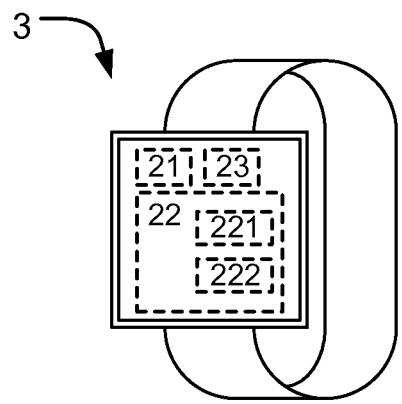
Figure 6:
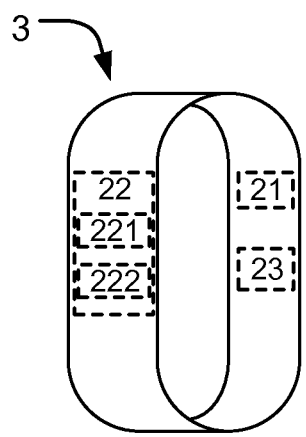
Figure 7:
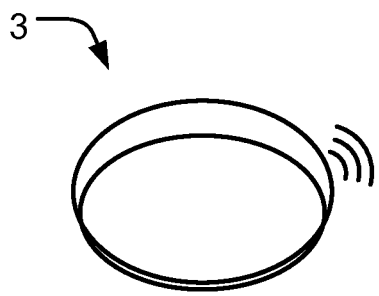
Figure 8:
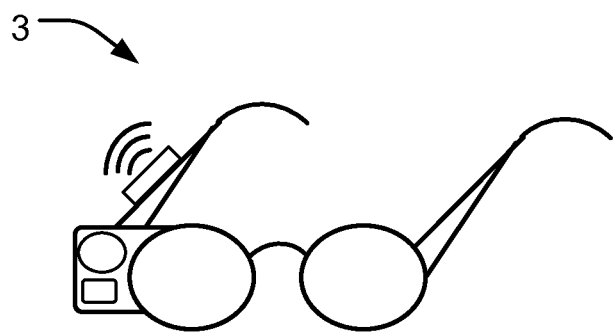
Figure 9:
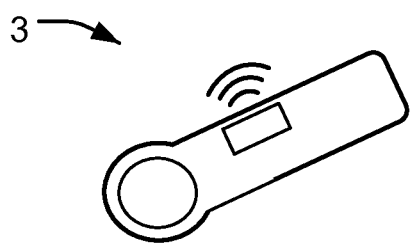

A requirement for the above methods to work is that the personal communication device 3 is BCC enabled. Examples of the personal communication device are seen in FIGS. 4-9. FIG. 4 illustrates a smartphone, FIG. 5 a smart watch, FIG. 6 a wristband FIG. 7 a ring, FIG. 8 glasses and FIG. 9 a headset. The personal communication device is equipped with a BCC antenna, for example a galvanic coupling area that is located as close as possible to the user's body.

FIG. 15 illustrates a user carrying two personal communication devices. In this case one or both needs to be BCC enabled for the methods to work. If both devices are BCC enabled there will be rules handling which of the personal communication devices that communicates with the communication device. It may also be the case that both personal communication devices communicate with the communication device directly through the selection indication means. All devices that appear, i.e. are reachable with BCC, when the user makes a selection indication are potential personal communication devices according to the disclosure. According to some aspects, the user interface component has multiple functions available during interaction, served by multiple personal communication devices. In other words, the settings of a user interface component may be controlled by one personal communication device of the user and the content of the user interface component may be controlled by another. A single personal communication device may also serve multiple functions to a single user interface component.

The present disclosure also provides for a method, performed in a system of a personal communication device 3 and a communication device 1 comprising a screen 5, for interaction with one or several users 4. Each user carries at least one personal communication device which is Body Coupled Communication, BCC, enabled. The screen displays, to the one or several users, information comprising one or several user interface components 6 and wherein the communication device comprises a selection indication means 7 which is BCC enabled and the one or several users uses the selection indication means to make selection indications of user interface components on the screen.

According to some aspects, the method of the system comprises:

registering S1, in the communication device 1, a selection indication on the screen;

determining S2, in the communication device 1, the position 2 of the selection indication on the screen;

identifying S3, in the communication device 1, a user interface component of the one or several user interface components which is associated with the position;

sending S6 a BCC send signal through the selection indication means comprising a first information associated with the identified user interface component;

receiving S11, in the personal communication device 3, the BCC send signal through the selection indication means and via the body of a user of the personal communication device comprising first information associated with the identified user interface component;

sending S12, in the personal communication device 3, a BCC response signal, in response to the received BCC send signal, through the selection indication means comprising second information associated with the identified user interface component;

receiving S7 a BCC response signal through the selection indication means, in response to the BCC send signal, from one of the personal communication devices (3), comprising a second information associated with the identified user interface component; and initiating S8, in the communication device 1, an action based on the second information.

The system performs a combined method of the methods of the communication device and the personal communication device as described above and the advantages have been previously described when discussing the methods separately.

The present disclosure also provides for a system comprising a communication device 1 comprising a screen 5 and a personal communication device 3, configured to interact with one or several users 4. Each user carries at least one personal communication device which is Body Coupled Communication, BCC, enabled. The screen displays, to the one or several users, information comprising one or several user interface components 6. The communication device comprises a selection indication means 7 which is BCC enabled and the one or several users uses the selection indication means to make selection indications of user interface components on the screen, wherein the communication device comprises communication circuitry 11 and processing circuitry 12. The processing circuitry is configured to:

register S1 a selection indication on the touch screen;

determining S2 the position 2 of the selection indication on the screen;

identify S3 a user interface component of the one or several user interface components which is associated with the position;

send S6 a BCC send signal through the selection indication means comprising a first information associated with the identified user interface component;

receive S7 a BCC response signal through the selection indication means, in response to the BCC send signal, from one of the personal communication devices 3, comprising a second information associated with the identified user interface component;

initiate S8 an action based on the second information; and

The personal communication device comprises communication circuitry 21 and processing circuitry 22. The processing circuitry 22 is configured to:

receive S11 a BCC send signal through the selection indication means and via the body of a user of the personal communication device comprising first information associated with an identified user interface component of the one or several user interface components; and send S12 a BCC response signal, in response to the received BCC signal, through the selection indication means comprising second information associated with the identified user interface component;

The system is a combination of the communication device 1 and the personal communication device 3 as described above. The advantages and the details have been previously described when discussing the communication device and the personal communication device separately.

It should be noted that the word "comprising" does not necessarily exclude the presence of other elements or steps than those listed. It should further be noted that any reference signs do not limit the scope of the claims, that the aspects of the disclosure may be implemented at least in part by means of both hardware and software, and that several "means" or "devices" may be represented by the same item of hardware.

The various aspects of the disclosure described herein are described in the general context of method steps or processes, which may be implemented according to some aspects by a computer program, comprising a computer readable program, which, when executed on a communication device 1, causes the communication device to perform the first method according to above and a computer readable program, which, when executed on a personal communication device 3, causes the personal communication device to perform the second method according to above. The computer programs, embodied in a computer-readable medium, include computer-executable instructions, such as program code, executed by computers in networked environments. A computer-readable medium may include removable and non-removable storage devices 13, 23 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed aspects of the disclosure. However, many variations and modifications can be made to these aspects of the disclosure. Accordingly, although specific terms are employed, they are used in a generic and descriptive sense only and not for purposes of limitation, the scope of the aspects of the disclosure being defined by the following claims.

The invention claimed is:

1. A method, performed in a communication device comprising a screen, for interaction with a user, wherein the user carries a personal communication device which is Body Coupled communication (BCC) enabled, the screen displays, to the user, information comprising one or several user interface components, and wherein the communication device comprises a selection indication means which is BCC enabled and the user uses the selection indication means to make selection indications of the user interface components on the screen, the method comprising:

registering a selection indication on the screen;

determining the position of the selection indication on the screen;

identifying a user interface component of the one or several user interface components which is associated with the position;

while detecting a user touch at the selection indication means:

sending a BCC send signal through the selection indication means comprising a first information associated with the identified user interface component; and receiving a BCC response signal through the selection indication means, in response to the BCC send signal, from the personal communication device, comprising a second information associated with the identified user interface component;

determining that the sending a BCC signal and the receiving a BCC signal exceeds an amount of time it takes the user to make a selection indication using the selection indication means;

presenting, in response to the determining that the sending a BCC signal and the receiving a BCC signal exceeds an amount of time it takes the user to make a selection indication using the selection indication means, an indication on the screen, indicating a need for the user to hold or resume touch of the selection indication means to complete BCC signaling; and initiating an action based on the second information.

2. The method according to claim 1, wherein the identified user interface component is one of: an application icon, a button, a text field, a menu item, an application window, a content of an application window, an item in an application window, a specified area of the touch screen, an image, a video.

3. The method according to claim 1, wherein the selection indication means is a touch screen and the selection indication is a touch on the touch screen and wherein the sending and receiving comprises sending and receiving BCC signals through the touch screen.

4. The method according to claim 1, wherein the selection indication means is a mouse and the selection indication is a mouse cursor over a user interface component or a mouse click on a user interface component or the selection indication means is a keyboard and the selection indication is the press of a key on the keyboard at a selected area.

5. The method according to claim 1, comprising:

confirming that the selection indication is performed by a user carrying the BCC enabled personal communication device by receiving at least one BCC signal from the personal communication device in connection with the registered selection indication on the screen.

6. The method according to claim 5, comprising:
communicating, to an application associated with the identified user interface component, that a selection indication has taken place on the identified user interface component and that the selection indication was performed by a user carrying the BCC enabled personal communication device; and
receiving, from the application, a third information associated with the use of the application.

7. The method according to claim 6, wherein the first information associated with the identified user interface component comprises a fourth information associated with the received third information associated with the use of the application.

8. The method according to claim 7, wherein the third information associated with the use of the application comprises a security challenge, from the application, associated with accessing the identified user interface component and wherein the received second information comprises a response to the security challenge and wherein the initiated action comprises sending the response to the security challenge to the application.

9. The method according to claim 7, wherein the third information associated with the use of the application comprises a request for device specific information associated with the use of the application and wherein the second information comprises the requested device specific information associated with the use of the application.

10. The method according to claim 1, wherein the first information associated with the identified user interface component comprises information that identifies the identified user interface component.

11. The method according to claim 1, wherein the first information associated with the identified user interface component comprises a request for the second information associated with the identified user interface component.

12. The method according to claim 1, comprising:
receiving identification information from the personal communication device via BCC at the selection indication on the screen.

13. A method, performed in a system, the system comprising a personal communication device and a communication device comprising a screen for interaction with a user, wherein the user carries the personal communication device which is Body Coupled Communication (BCC) enabled, the screen displays, to the user, information comprising one or several user interface components and wherein the communication device comprises a selection indication means which is BCC enabled and the user uses the selection indication means to make selection indications of user interface components on the screen, the method comprising:
registering, in the communication device, a selection indication on the screen;
determining, in the communication device, the position of the selection indication on the screen;
identifying, in the communication device, a user interface component of the one or several user interface components which is associated with the position;
while the communication device detects a user touch at the selection indication means, sending, by the communication device, a BCC send signal through the selection indication means comprising a first information associated with the identified user interface component;
receiving, in the personal communication device, the BCC send signal through the selection indication means and via the body of a user of the personal communication device comprising first information associated with the identified user interface component;
sending, by the personal communication device, a BCC response signal, in response to the received BCC send signal, through the selection indication means comprising second information associated with the identified user interface component;
while the communication device detects a user touch at the selection indication means, receiving, by the communication device, a BCC response signal through the selection indication means, in response to the BCC send signal, from one of the personal communication devices, comprising a second information associated with the identified user interface component;
determining that the sending a BCC signal and the receiving a BCC signal exceeds an amount of time it takes the user to make a selection indication using the selection indication means;
presenting, in response to the determining that the sending a BCC signal and the receiving a BCC signal exceeds an amount of time it takes the user to make a selection indication using the selection indication means, an indication on the screen, indicating a need for the user to hold or resume touch of the selection indication means to complete BCC signaling; and
initiating, in the communication device, an action based on the second information.

14. A communication device comprising a screen, the screen configured to interact with a user, wherein the user carries at least one personal communication device which is Body Coupled communication (BCC) enabled, wherein the screen displays, to the user, information comprising one or several user interface components and wherein the communication device comprises a selection indication means which is BCC enabled and the user uses the selection indication means to make selection indications of user interface components on the screen, the communication device further comprising:
communication circuitry; and
processing circuitry configured to:
register a selection indication on the screen;
determine the position of the selection indication on the screen;
identify a user interface component of the one or several user interface components which is associated with the position;
while detecting a user touch at the selection indication means:
send a BCC send signal through the selection indication means comprising a first information associated with the identified user interface component; and
receive a BCC response signal through the selection indication means, in response to the BCC send signal, from the personal communication device, comprising a second information associated with the identified user interface component;
determine that the sending a BCC signal and the receiving a BCC signal exceeds an amount of time it takes the user to make a selection indication using the selection indication means;
present, in response to the determining that the sending a BCC signal and the receiving a BCC signal exceeds an amount of time it takes the user to make a selection indication using the selection indication means, an indication on the screen, indicating a need for the user to hold or resume touch of the selection indication means to complete BCC signaling; and initiate an action based on the second information.

15. A system comprising a personal communication device and a communication device comprising a screen, the screen configured to interact with a user, wherein the user carries the personal communication device and wherein the personal communication device is Body Coupled Communication (BCC) enabled, wherein the screen displays, to the user, information comprising one or several user interface components, and wherein the communication device comprises a selection indication means which is BCC enabled and the user uses the selection indication means to make selection indications of user interface components on the screen, wherein the communication device further comprises:

communication circuitry;

processing circuitry configured to:

register a selection indication on the touch screen;

determining the position of the selection indication on the screen;

identify a user interface component of the one or several user interface components which is associated with the position;

while detecting a user touch at the selection indication means:

send a BCC send signal through the selection indication means comprising a first information associated with the identified user interface component; and receive a BCC response signal through the selection indication means, in response to the BCC send signal, from the personal communication device, comprising a second information associated with the identified user interface component;

determine that the sending a BCC signal and the receiving a BCC signal exceeds an amount of time it takes the user to make a selection indication using the selection indication means;

present, in response to the determining that the sending a BCC signal and the receiving a BCC signal exceeds an amount of time it takes the user to make a selection indication using the selection indication means, an indication on the screen, indicating a need for the user to hold or resume touch of the selection indication means to complete BCC signaling; and initiate an action based on the second information; and wherein the personal communication device comprises:

communication circuitry;

processing circuitry configured to:

receive a BCC send signal through the selection indication means and via the body of a user of the personal communication device comprising first information associated with an identified user interface component of the one or several user interface components; and send a BCC response signal, in response to the received BCC signal, through the selection indication means comprising second information associated with the identified user interface component.

16. A non-transitory computer readable medium encoded with a computer program for execution on a communication device, the communication device comprising a screen for interaction with a user, wherein the user carries a personal communication device, wherein the personal communication device is Body Coupled Communication (BCC) enabled, wherein the screen displays, to the user, information comprising one or several user interface components and wherein the communication device comprises a selection indication means which is BCC enabled and the user uses the selection indication means to make selection indications of user interface components on the screen, wherein the computer program, when executed on the communication device, causes the communication device to perform the steps comprising:

registering, in the communication device, a selection indication on the screen;

determining, in the communication device, the position of the selection indication on the screen;

identifying, in the communication device, a user interface component of the one or several user interface components which is associated with the position;

while the communication device detects a user touch at the selection indication means, sending, by the communication device, a BCC send signal through the selection indication means comprising a first information associated with the identified user interface component;

while the communication device detects a user touch at the selection indication means, receiving, by the communication device, a BCC response signal through the selection indication means, in response to the BCC send signal, from the personal communication device, comprising a second information associated with the identified user interface component;

determining that the sending a BCC signal and the receiving a BCC signal exceeds an amount of time it takes the user to make a selection indication using the selection indication means;

presenting, in response to the determining that the sending a BCC signal and the receiving a BCC signal exceeds an amount of time it takes the user to make a selection indication using the selection indication means, an indication on the screen, indicating a need for the user to hold or resume touch of the selection indication means to complete BCC signaling; and initiating, in the communication device, an action based on the second information.

* * * * *